(12) United States Patent
Takeuchi et al.

(10) Patent No.: US 11,635,845 B2
(45) Date of Patent: Apr. 25, 2023

(54) DISPLAY DRIVER, DISPLAY DEVICE AND METHOD OF DRIVING DISPLAY PANEL

(71) Applicant: Synaptics Japan GK, Tokyo (JP)

(72) Inventors: Makoto Takeuchi, Tokyo (JP); Shigeru Ota, Tokyo (JP); Atsushi Shikata, Tokyo (JP); Kentaro Suzuki, Tokyo (JP); Jiro Shimbo, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 95 days.

(21) Appl. No.: 17/036,751

(22) Filed: Sep. 29, 2020

(65) Prior Publication Data

US 2021/0011575 A1    Jan. 14, 2021

Related U.S. Application Data

(63) Continuation of application No. 16/130,733, filed on Sep. 13, 2018, now Pat. No. 10,802,645.

(30) Foreign Application Priority Data

Sep. 22, 2017 (JP) ................................ 2017-182763

(51) Int. Cl.
  *G06F 3/041* (2006.01)
  *G09G 3/20* (2006.01)
  *G06F 3/044* (2006.01)

(52) U.S. Cl.
  CPC .......... *G06F 3/04166* (2019.05); *G06F 3/044* (2013.01); *G06F 3/0412* (2013.01);
  (Continued)

(58) Field of Classification Search
  CPC ............. G06F 3/04166; G06F 3/04184; G06F 3/0412; G06F 3/0416; G06F 3/044; G09G 3/20; G09G 3/2092
  See application file for complete search history.

(56) References Cited

U.S. PATENT DOCUMENTS 10,054,811 B2    8/2018  Park et al.
10,198,130 B2    2/2019  Liu et al.
(Continued)

FOREIGN PATENT DOCUMENTS

CN    104103248 A    10/2014
CN    105320381 A    2/2016
(Continued)

*Primary Examiner* — Sejoon Ahn
(74) *Attorney, Agent, or Firm* — Leydig, Voit & Mayer, Ltd.

(57) ABSTRACT

A display driver comprises a touch controller configured to perform touch sensing on a display panel during a vertical sync period. A first field of the vertical sync period comprises a display period and a touch sensing period following the display period. A start timing of the touch sensing period is controlled by an internal clock signal. A first counter is configured to, responsive to completion of the touch sensing, start a counting operation in synchronization with the internal clock signal. Gate control signal generator circuitry is configured to control a gate driver that is configured to drive a plurality of gate lines of the display panel. A gate line that is to be driven first to a high level during a second field following the first field is driven to the high level responsive to a count value of the first counter during the first field.

20 Claims, 9 Drawing Sheets

(52) U.S. Cl.
CPC ........ *G06F 3/0416* (2013.01); *G06F 3/04184*
(2019.05); *G09G 3/20* (2013.01); *G09G*
*3/2092* (2013.01); *G09G 2310/0264* (2013.01);
*G09G 2310/0267* (2013.01); *G09G 2310/067*
(2013.01); *G09G 2310/08* (2013.01); *G09G*
*2354/00* (2013.01)

(56) References Cited

U.S. PATENT DOCUMENTS

| | | | |
|---|---|---|---|
| 10,198,135 | B2 | 2/2019 | Huang et al. |
| 10,665,154 | B1* | 5/2020 | Chen ........................ G09G 3/32 |
| 2011/0012854 | A1 | 1/2011 | Liu et al. |
| 2013/0030781 | A1 | 1/2013 | Yoneda et al. |
| 2017/0153736 | A1 | 6/2017 | Kim et al. |
| 2020/0111439 | A1* | 4/2020 | Kim ..................... G09G 3/3614 |
| 2020/0160747 | A1* | 5/2020 | Yang ....................... G09F 9/377 |

FOREIGN PATENT DOCUMENTS

| | | | |
|---|---|---|---|
| JP | 2014146093 | A | 8/2014 |
| JP | 2015143844 | A | 8/2015 |
| JP | 2016045329 | A | 4/2016 |
| JP | 2016050952 | A | 4/2016 |
| JP | 2016143029 | A | 8/2016 |
| JP | 2017167250 | A | 9/2017 |

\* cited by examiner

DISPLAY DRIVER, DISPLAY DEVICE AND METHOD OF DRIVING DISPLAY PANEL

CROSS REFERENCE

This application is a continuation of U.S. patent application Ser. No. 16/130,733, filed Sep. 13, 2018, which claims priority to Japanese Patent Application No. 2017-182763, filed on Sep. 22, 2018, the disclosure of which is incorporated herein by reference in their entirety.

TECHNICAL FIELD

The present disclosure relates to a display driver, a display device and a method for driving a display panel.

BACKGROUND

A display device adapted to touch sensing which senses contact of a conductor such as a user's finger and a stylus onto a display panel may be configured to perform image displaying and touch sensing in a time-divisional manner. Such configuration is often used especially when a display panel incorporates therein touch sensing electrodes used for touch sensing.

In a display device thus configured, a plurality of fields may be defined in each vertical sync period, each field including a display period and a touch sensing period.

The start timings of each vertical sync period and each horizontal sync period of a display device may be indicated by a host such as an application processor, and the start timing of each field may be determined to be synchronous with the start timing of the horizontal sync period indicated by the host. Meanwhile, the start timings of each display period and each touch sensing period in each field may be allowed to be determined in the display driver and the touch controller, for example, by counting an internal clock signal generated in the touch controller-embedded display driver.

In a display device thus configured, the image quality of the display panel may be affected by variations in the frequency of the horizontal sync period in the host and variations in the frequency of the internal clock signal in the display driver and the touch controller.

SUMMARY

In one embodiment, a display driver comprises a touch controller configured to perform touch sensing on a display panel during a vertical sync period. A first field of the vertical sync period comprises a display period and a touch sensing period following the display period. A start timing of the touch sensing period is controlled by an internal clock signal. The display driver further comprises a first counter configured to, responsive to completion of the touch sensing during the touch sensing period, start a counting operation in synchronization with the internal clock signal. The display driver further comprises gate control signal generator circuitry configured to control a gate driver that is configured to drive a plurality of gate lines of the display panel. A gate line that is to be driven first to a high level during a second field following the first field is driven to the high level responsive to a count value of the first counter during the first field.

In another embodiment, a display device comprises a display panel comprising a plurality of gate lines; and a gate driver configured to drive the plurality of gate lines. The display device further comprises a display driver comprising an oscillator configured to generate an internal clock signal, and a touch controller configured to perform touch sensing on the display panel during a vertical sync period. A first field of the vertical sync period comprises a display period and a touch sensing period following the display period. A start timing of the touch sensing period is controlled by the internal clock signal. The display driver further comprises a first counter configured to, responsive to completion of the touch sensing during the touch sensing period, start a counting operation in synchronization with the internal clock signal. The display driver further comprises gate control signal generator circuitry configured to control the gate driver. A gate line that is to be driven first to a high level during a second field following the first field is driven to the high level responsive to a count value of the first counter during the first field.

In another embodiment, a method for driving a display panel comprises generating an internal clock signal and performing touch sensing on the display panel during a vertical sync period. A first field of the vertical sync period comprises a display period and a touch sensing period following the display period. A start timing of the touch sensing period is controlled by the internal clock signal. The method further comprises performing, responsive to completion of the touch sensing during the touch sensing period, a counting operation in synchronization with the internal clock signal to output a count value. The method further comprises controlling a gate driver that is configured to drive a plurality of gate lines of the display panel, wherein a gate line that is to be driven first to a high level during a second field following the first field is driven to the high level responsive to the count value during the first field.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

DETAILED DESCRIPTION

Figure 1:
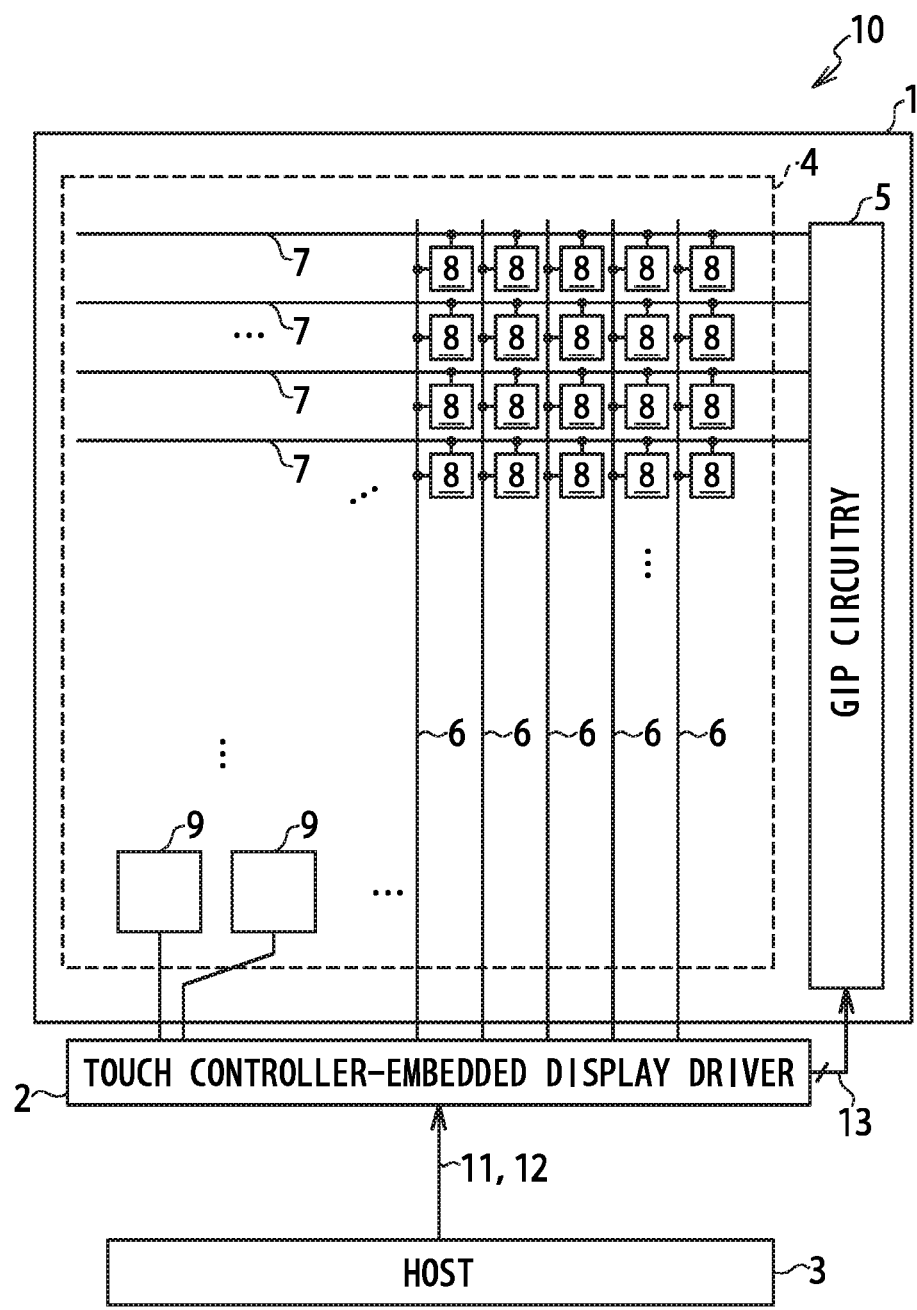
FIG. 1 is a block diagram illustrating the configuration of a display device in one embodiment.

In the following, a description is given of various embodiments with referenced to attached drawings. In the drawing, same or similar components may be denoted by same or corresponding reference numerals.

In one or more embodiments, as illustrated in FIG. 1, a display device 10 includes a display panel 1 and a touch controller-embedded display driver 2, which is hereinafter simply referred to as "display driver 2". The display device 10 is configured to display an image corresponding to an image data 11 received from a host 3. A liquid crystal display panel or an OLED (organic light emitting diode) display panel may be used as the display panel 1, for example.

The operation of the display device 10 is controlled on control data 12 supplied from the host 3. In one or more embodiments, the control data 12 may include VSYNC packets and HSYNC packets and the operation timing of the display device 10 may be controlled by using the VSYNC packets and HSYNC packets. A VSYNC packet indicates the start timing of a vertical sync periods and is generated in synchronization with a vertical sync signal generated in the host 3. An HSYNC packet indicates the start timing of a horizontal sync period and is generated in synchronization with a horizontal sync signal generated in the host 3. The indication of the start timings of a vertical sync period and a horizontal sync period may be achieved by supplying a vertical sync signal and a horizontal sync signal from the host 3 to the display driver 2 instead of supplying a VSYNC packet and an HSYNC packet.

The display panel 1 includes a display area 4 and a GIP circuitry 5.

Provided in the display area 4 are a plurality of source lines 6, which may be also referred to as signal lines, and a plurality of gate lines 7, which may be also referred to as scan lines, and pixel circuits 8 disposed at intersections of the source lines 6 and the gate lines 7. Each pixel circuit 8 is connected to a corresponding source line 6 and gate line 7. When an image is displayed, the gate lines 7 are sequentially selected and drive voltages generated depending on the grayscale values described in the image data 11 are written into the pixel circuits 8 connected to the selected gate line 7 via the source lines 6. When a certain gate line 7 is driven to the high level, pixel circuits 8 connected to the gate line 7 are placed into a state in which the pixel circuits 8 are ready to be written with drive voltages. The drive voltages applied to the source lines 6 at the moment just before the gate line 7 is switched to the low level are written into the pixel circuits 8. Hereinafter, pixel circuits 8 connected to a gate line 7 may be referred to as a line of pixel circuits 8.

Touch sensing electrodes 9 are further provided in the display area 4. The display driver 2 performs touch sensing by using the touch sensing electrodes 9 and transmits to the host 3 a touch sensing data 14 indicative of the result of the touch sensing. The touch sensing data 14 may be generated to indicate the position at which a conductor is placed into contact with the display panel 1, for example. The touch sensing may be achieved through self-capacitance sensing or mutual capacitance sensing. When self-capacitance touch sensing is performed, the display driver 2 senses the self-capacitances of the respective touch sensing electrodes 9, and achieves touch sensing on the basis of the sensed self-capacitances. When mutual capacitance touch sensing is performed, drive electrodes are provided in the display panel 1. The display driver 2 senses the mutual capacitances formed between the drive electrodes and the respective touch sensing electrodes 9 and achieves touch sensing on the basis of the sensed mutual capacitances. In an alternative embodiment, a touch panel incorporating touch sensing electrodes may be placed on the display panel 1.

The GIP circuitry 5 operates as a gate driver configured to supply gate drive signals to the gate lines 7 disposed in the display area 4 in response to gate control signals 13 received from the display driver 2. The gate control signals 13 are a set of signals controlling the timing of the gate drive signals supplied to the respective gate lines 7 from the GIP circuitry 5. In this embodiment, the gate control signals 13 include gated shift clocks (GSCs). The gated shift clocks are a set of multi-phase clock signals controlling the timing at which the gate drive signals supplied to the respective gate lines 7 are set to the high level and the low level.

Figure 2:
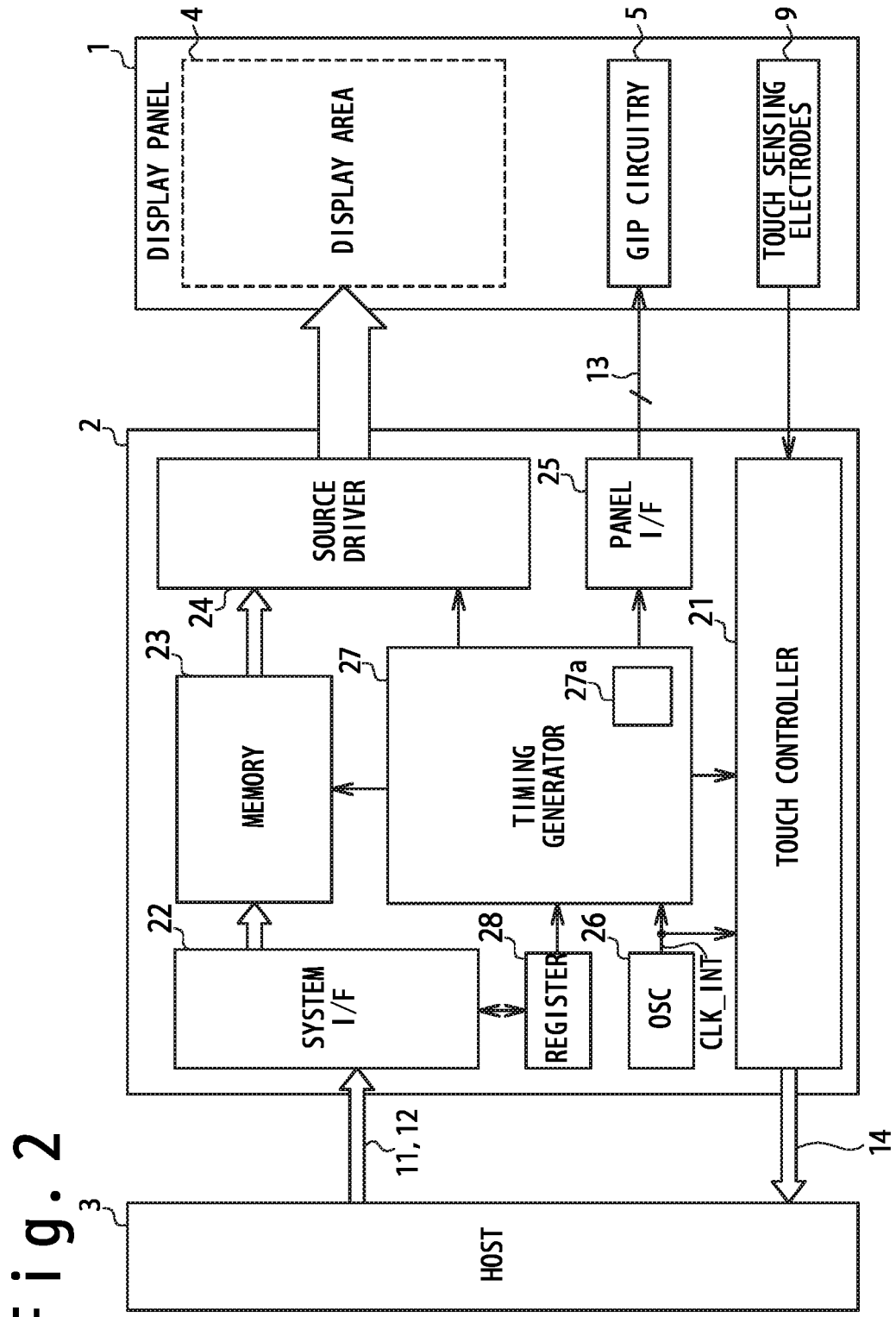
FIG. 2 is a block diagram illustrating the configuration of a display driver in one embodiment.

In one or more embodiments, as illustrated in FIG. 2, the display driver 2 includes a touch controller 21, a system interface 22, a memory 23, a source driver 24, a panel interface 25, an oscillator 26, a timing generator 27 and a register 28. In one or more embodiments, the touch controller 21, the system interface 22, the memory 23, the source driver 24, the panel interface 25, the oscillator 26, the timing generator 27 and the register 28 may be monolithically integrated in the same semiconductor chip. In an alternative embodiment, the touch controller 21 may be integrated in a different semiconductor chip.

The touch controller 21 performs touch sensing on the basis of the capacitances of the touch sensing electrodes 9 integrated in the display panel 1, more specifically, the self-capacitances of the touch sensing electrodes 9 and/or the mutual capacitances formed between the drive electrodes and the touch sensing electrodes 9, to generate the touch sensing data 14.

The system interface 22 communicates with the host 3 to exchange various data used to control the display driver 2. More specifically, the system interface 22 receives image data 11 from the host 3 and forwards the received image data 11 to the memory 23. The system interface 22 also receives various control data 12 from the host 3. The control data 12 may include commands for controlling the display driver 2 and register values to be stored in the register 28.

The memory 23 receives the image data 11 from the system interface 22 and stores therein the same. The image data 11 stored in the memory 23 are read out at appropriate timing and supplied to the source driver 24.

The source driver 24 operates as drive circuitry configured to drive the source lines 6 disposed in the display area 4 of the display panel 1 in response to the image data 11 received from the memory 23. More specifically, the source driver 24 performs digital-analog conversion on the image data 11 received from the memory 23, and thereby generates the drive voltages to be supplied to the respective source lines 6. The generated drive voltages are supplied to the respective pixel circuits 8 in the display area 4 via the source lines 6 to thereby drive the respective pixel circuits 8.

The panel interface 25 operates as gate control signal generator circuitry configured to generate gate control signals 13 under the control of the timing generator 27, and supplies the generated gate control signals 13 to the GIP circuitry 5 of the display panel 1. As described above, the gate control signals 13 include the gated shift clocks. A gate control signal circuitry may be disposed separately from the panel interface 25. In this case, the generated gate control signals 13 may be supplied to the display panel 1 directly or via the panel interface 25.

The oscillator 26 generates an internal clock signal CLK_INT. Although FIG. 2 illustrates the configuration in which the internal clock signal CLK_INT is supplied to the touch controller 21 and the timing generator 27, a person skilled in the art would appreciate that the internal clock signal CLK_INT may be supplied to other circuits.

The timing generator 27 performs timing control of the memory 23, the source driver 24 and the panel interface 25 in response to the control data 12 received from the host 3. For example, the timing generator 27 controls the start timing of each field in each vertical sync period and the start timing of the display period and touch sensing period in each field.

The register 28 stores therein commands and register values used for controlling the display driver 2. The commands and register values included in the control data 12 received from the host 3 are stored in the register 28.

In one or more embodiments, the display device 10 is configured to perform image displaying and touch sensing in a time-divisional manner. In one or more embodiments, a plurality of fields are defined in each vertical sync period, and a display period and a touch sensing period are disposed in each field. In the display period, an operation to display an image on the display area 4 of the display panel 1, that is, an operation to drive selected pixel circuits 8 is performed. In the touch sensing period, touch sensing is performed by the touch controller 21. It should be noted that no touch sensing period may be provided in the last field of each vertical sync period.

Figure 3:
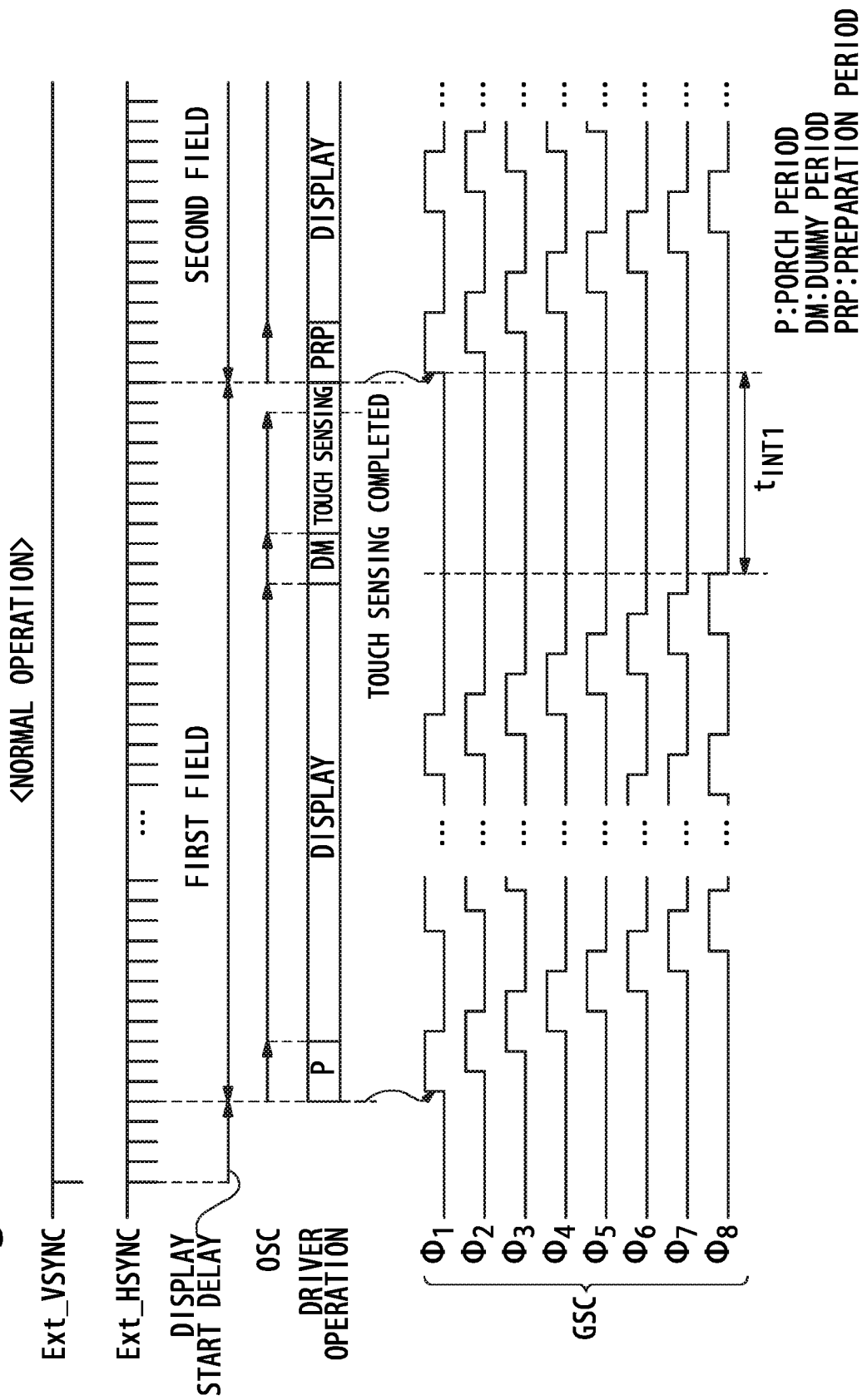
FIG. 3 is a timing chart illustrating one example of the operation of the display device.

FIG. 3 illustrates one example of the operation of the display device 10, in which "Ext_VSYNC" denotes the vertical sync signal generated in the host 3 and "Ext_HSYNC" denotes the horizontal sync signal generated in the host 3. The vertical sync signal Ext_VSYNC defines the vertical sync periods, and the horizontal sync signal Ext_HSYNC defines the horizontal sync periods.

The start timing of each field is controlled on the vertical sync signal Ext_VSYNC and the horizontal sync signal Ext_HSYNC, which are both generated in the host 3. More specifically, when the vertical sync signal Ext_VSYNC is asserted, a VSYNC packet is transmitted to the display driver 2 and the first field is started after a given delay time has elapsed. This delay time is referred to as the display start delay and indicated by the legend "DISPLAY START DELAY" in FIG. 3. The display start delay is defined as the number of assertions of the horizontal sync signal Ext_HSYNC after the assertion of the vertical sync signal Ext_VSYNC. In the operation illustrated in FIG. 3, the first field is started when the horizontal sync signal Ext_HSYNC is asserted four times after the vertical sync signal Ext_VSYNC is asserted. The display driver 2 is able to recognize the number of assertions of the horizontal sync signal Ext_HSYNC on the basis of the number of HSYNC packets received after the reception of the VSYNC packet. The second field is started when the horizontal sync signal Ext_HSYNC is asserted a given number of times, after the first field is started. Similarly, the third and following fields are started when the horizontal sync signal Ext_HSYNC is asserted a given number of times after the previous field is started.

The first field includes a porch period, a display period, a dummy period and a touch sensing period. The porch period, which is disposed at the beginning of the first field, is used for preparation for driving pixel circuits 8 in the following display period. In the display period, drive voltages are successively written into selected lines of pixel circuits 8. The dummy period provides a waiting time for the transition from the display period to the touch sensing period. In the touch sensing period, touch sensing is performed by the touch controller 21. In an alternative embodiment, the dummy period may be omitted.

The start timings of the display period, the dummy period and the touch sensing period in the first field are controlled on the internal clock signal CLK_INT generated by the oscillator 26. More specifically, the timing generator 27 includes a counter 27a configured to count clock pulses of the internal clock signal CLK_INT and the start timings of the display period, the dummy period and the touch sensing period are controlled on the count value outputted from the counter 27a.

The second field includes a preparation period, a display period, a dummy period and a touch sensing period. Note that the dummy period and the touch sensing period are not illustrated in FIG. 3. The preparation period, which is disposed at the beginning of the second field, is used for preparation for driving pixel circuits 8 in the following display period. In the display period, drive voltages are successively written into selected lines of pixel circuits 8. The dummy period provides a waiting time for the transition from the display period to the touch sensing period. In the touch sensing period, touch sensing is performed by the touch controller 21. Although not illustrated, the fields following the second field are configured similarly to the second field.

In each field, the gate line drive signals supplied to the selected gate lines 7 are sequentially driven to the high level. In this embodiment, the waveforms of the gate line drive signals supplied to the respective gate lines 7 are controlled on the gated shift clocks. In one or more embodiments, the gated shift clocks include eight-phase clock signals $\phi_1$ to $\phi_8$.

Figure 4:
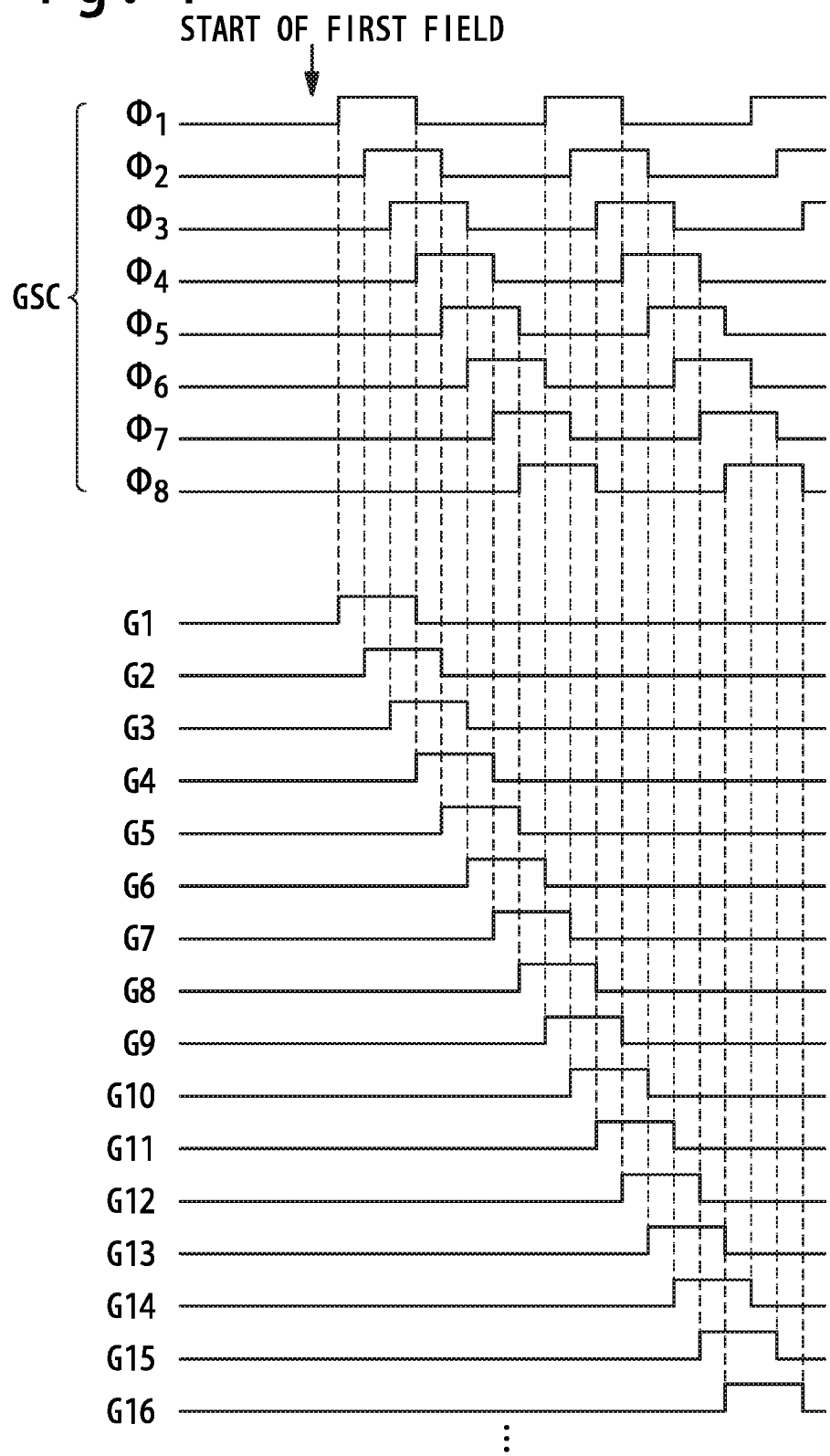
FIG. 4 is a timing chart illustrating the relationship between the waveforms of the gate line drive signals and those of eight-phase clock signals used as gated shift clocks.

In the timing chart illustrated in FIG. 4, "G1" represents the waveform of the gate line drive signal supplied to the gate line 7 that is driven first in each vertical sync period, and "G2" represents the waveform of the gate line drive signal supplied to the gate line 7 that is driven second in each vertical sync period. Similarly, "Gi" represents the waveform of the gate line drive signal supplied to the gate line 7 that is driven $i^{th}$ in each vertical sync period. In the following, the gate line 7 that is driven $i^{th}$ in each vertical sync period may be simply referred to as the $i^{th}$ gate line 7.

The eight-phase clocks $\phi_1$ to $\phi_8$ are cyclically used to control the timing at which the gate line drive signal supplied to each gate line 7 is driven to the high level and set to the low level. More specifically, the gate line drive signal Gi is driven to the high level when the clock signal $\phi_{Ri}$ is asserted (Qi+1) times, and set to the low level when the clock signal $\phi_{Ri}$ is deasserted (Qi+1) times, where Qi is the quotient when i is divided by 8, and Ri is the remainder.

For example, the gate line drive signal G1 is driven to the high level when the clock signal $\phi_1$ is first asserted, in FIG. 4, set to the high level, in each vertical sync period, and set to the low level when the clock signal $\phi_1$ is first deasserted. Similarly, the gate line drive signal G2 is driven to the high level when the clock signal $\phi_2$ is first asserted in each vertical sync period, and set to the low level when the clock signal $\phi_2$ is first deasserted. The similar goes for the gate line drive signals G3 to G8.

The gate line drive signal G9 is driven to the high level when the clock signal $\phi_1$ is asserted twice in each vertical sync period, and set to the low level when the clock signal $\phi_1$ is deasserted twice. The gate line drive signal G10 is driven to the high level when the clock signal $\phi_2$ is asserted twice in each vertical sync period, and set to the low level when the clock signal $\phi_2$ is deasserted twice. The similar goes for other gate line drive signals.

The number of the multi-phase clock signals used as the gated shift clocks may be any number of two or more, not limited to eight. Also in this case, the multi-phase clock signals are cyclically used to control the waveforms of the gate line drive signals. When the m-phase clock signals $\phi_1$ to $\phi_m$ are used, for example, the gate line drive signal Gi supplied to the $i^{th}$ gate line 7 is driven to the high level when the clock signal $\phi_{Ri}$ is asserted (Qi+1) times, and set to the low level when the clock signal $\phi_{Ri}$ is deasserted (Qi+1) times, where Qi is the quotient when i is divided by m, and Ri is the remainder.

In the operation illustrated in FIG. 3, the length of the touch sensing period of each field depends on the frequency of the horizontal sync signal Ext_HSYNC generated in the host 3 and the frequency of the internal clock signal CLK_INT generated by the oscillator 26. This is because the start timing of the touch sensing period is generated in synchronization of the internal clock signal CLK_INT, whereas the start timing of the next field is synchronous with the horizontal sync signal Ext_HSYNC generated in the host 3.

Figure 5:
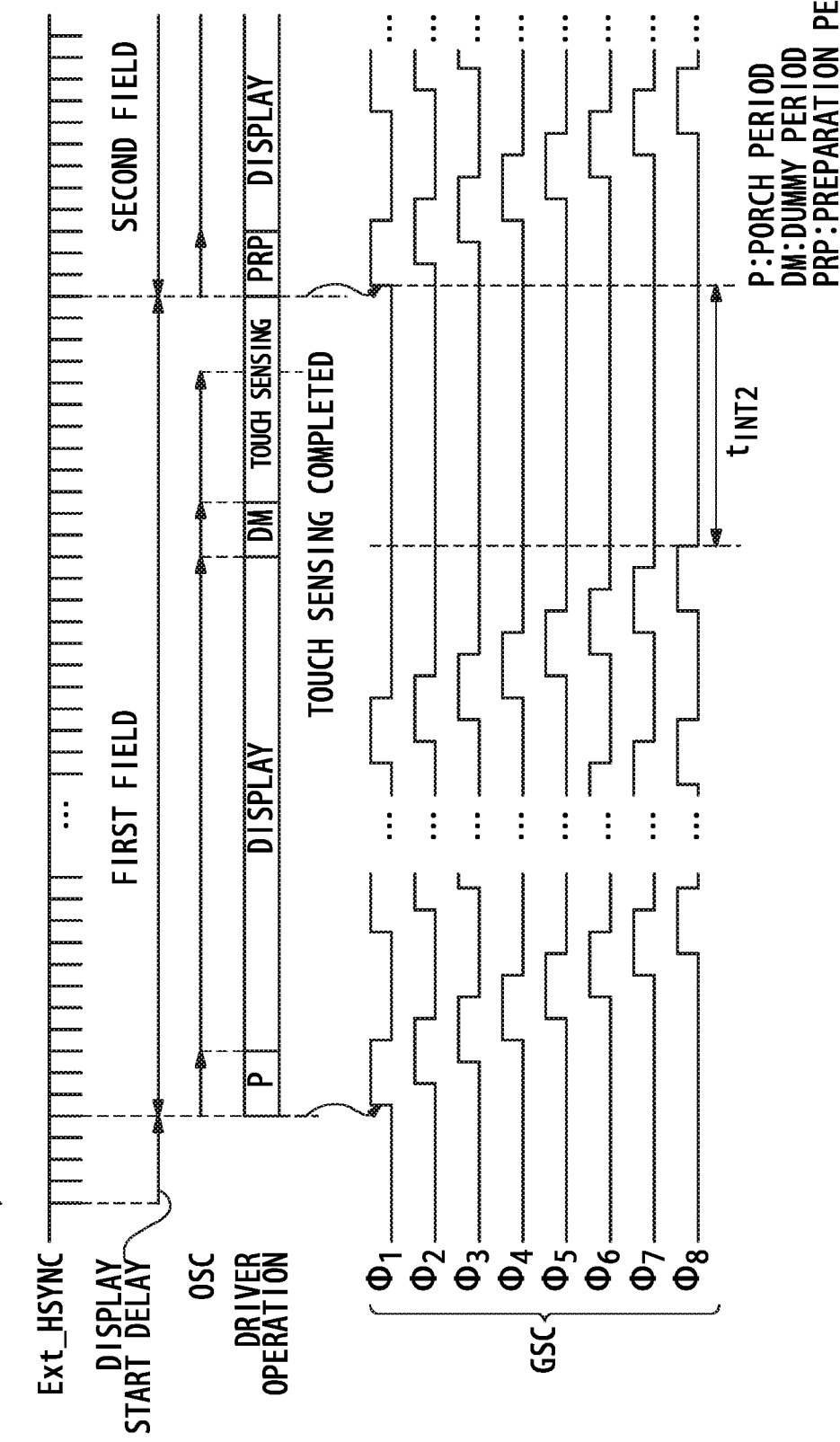
FIG. 5 is a timing chart illustrating an example of the operation of the display device.

As illustrated in FIG. 5, for example, when the frequency of the horizontal sync signal Ext_HSYNC generated in the host 3 is reduced, the start timing of the second field is delayed, and this lengthens the touch sensing period in the first field. When the frequency of the horizontal sync signal Ext_HSYNC generated in the host 3 is increased, the start timing of the touch sensing period is advanced and this also lengthens the touch sensing period in the first field.

During the touch sensing period, all the gate lines 7 are set to the low level and a "charge leakage" occurs, in which the charges are gradually leaked from the storage capacitors of the respective pixel circuits 8. The charge leakage may affect the image quality of the image displayed on the display panel 1, depending on the length of the touch sensing period. The advance of the "charge leakage" may be visually perceived as horizontal stripes by a user who observes the display panel 1.

In the example illustrated in FIG. 5, all the gate lines 7 are kept at the low level, during the period $t_{INT2}$ from the deassertion of the clock signal $\phi 8$ to the assertion of the clock signal (N. In the operation illustrated in FIG. 5, in which the frequency of the horizontal sync signal Ext_HSYNC is reduced, the period $t_{INT2}$ is lengthened and the charge leakage progresses. A similar phenomenon may occur when the frequency of the internal clock signal CLK_INT generated by the oscillator 26 is increased.

In one or more embodiments, to reduce an influence on the image quality, the gate line control signals 13, which may include gated shift clocks, are generated so that the period during which all the gate lines 7 are set to the low level is not made excessively long.

Figure 6:
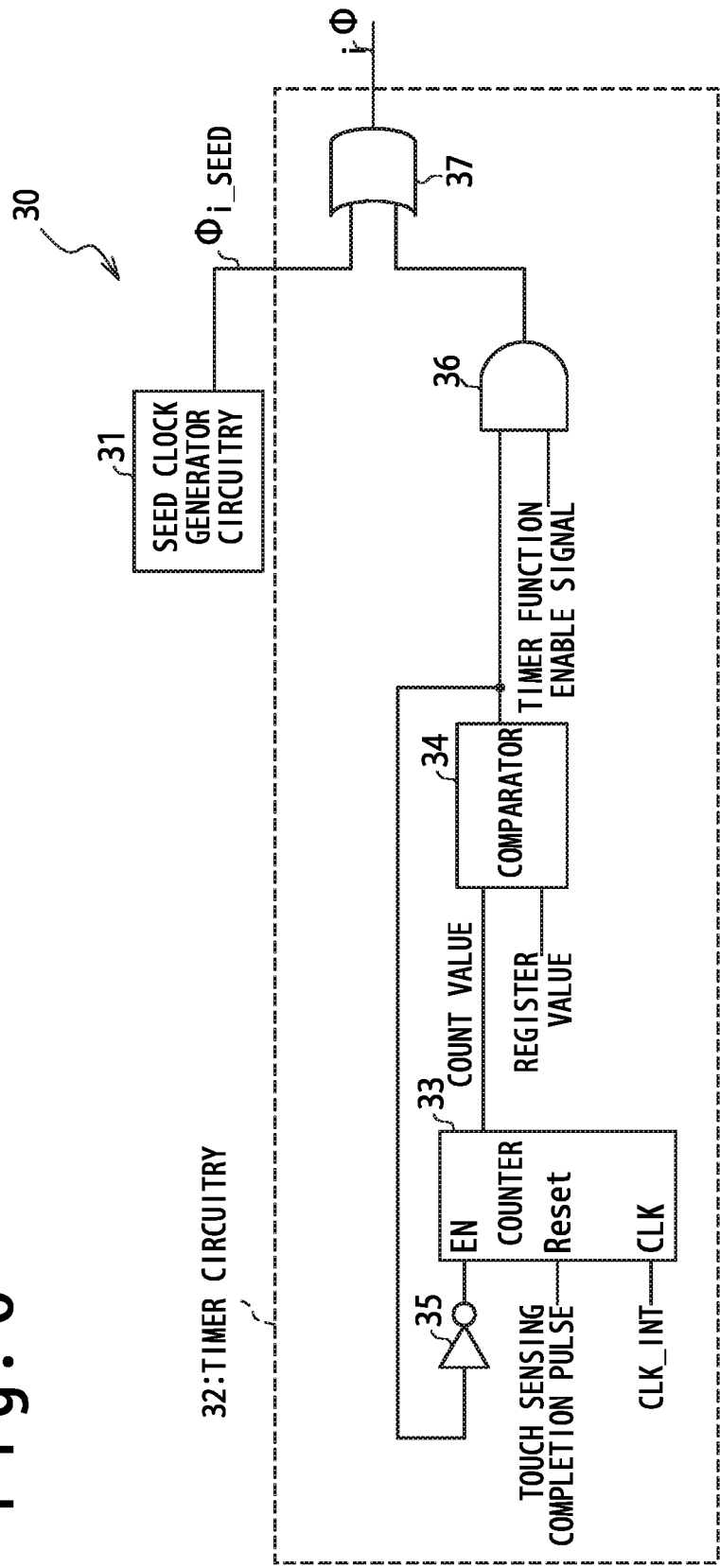
FIG. 6 is a block diagram illustrating the configuration of a gated shift clock generator circuitry in one or more embodiments.

A gated shift clock generator circuitry 30 illustrated in FIG. 6, which is configured to generate the clock signal $\phi_i$ of the gated shift clocks, includes a seed clock generator circuitry 31 and a timer circuitry 32. The seed clock generator circuitry 31 generates a clock signal $\phi_{i\_SEED}$ used as a seed of the clock signal $\phi_i$. When each field is started, the seed clock generator circuitry 31 starts counting the internal clock signal CLK_INT generated by the oscillator 26, and generates the clock signal $\phi_{i\_SEED}$ through asserting and deasserting the clock signal $\phi_{i\_SEED}$ when the count value reaches predetermined values.

The timer circuitry 32 is configured to start a counting operation synchronous with the internal clock signal CLK_INT when the touch sensing is completed in the touch sensing period, and forcedly assert the clock signal $\phi_i$ when the count value reaches a predetermined value.

The timer circuitry 32 includes a counter 33, a comparator 34, an inverter 35, an AND gate 36 and an output stage 37.

The counter 33 performs a counting operation in synchronization with the internal clock signal CLK_INT. The counter 33 has a clock terminal receiving the internal clock signal CLK_INT, a reset terminal receiving a touch sensing completion pulse, and an enable terminal receiving the output signal of the inverter 35. The touch sensing completion pulse referred to herein is a pulse supplied from the touch controller 21 to the counter 33 when the touch sensing is completed in the touch sensing period.

The comparator 34 compares the count value outputted from the counter 33 with a predetermined register value stored in the register 28. The comparator 34 asserts the output signal thereof when the count value reaches the register value.

The inverter 35 generates an output signal by inverting the output signal of the comparator 34. The output signal of the inverter 35 is supplied to the enable terminal of the counter 33.

The AND gate 36 outputs an output signal having a value of the logical product of the output signal of the comparator 34 and a timer function enable signal, which is a signal to enable and disable the operation of the timer circuitry 32. The timer circuitry 32 is allowed to operate when the timer function enable signal is asserted. When the timer function enable signal is deasserted, the output signal of the AND gate 36 is unconditionally deasserted to invalidate the operation of the timer circuitry 32.

The output stage 37 synthesizes the clock signal $\phi_{i\_SEED}$ received from the seed clock generator circuitry 31 and the output signal of the AND gate 36 to generate the clock signal $\phi_i$. In one embodiment, an OR gate may be used as the output stage 37.

The gated shift clock generator circuitry 30 operates as follows. In the operation described below, it is assumed that the time function enable signal is asserted to allow the timer circuitry 32 to operate.

When each field is started, the seed clock generator circuitry 31 starts to generate the clock signal $\phi_{i\_SEED}$. In the meantime, the counter 33 of the timer circuitry 32 does not operate and the output signals of the comparator 34 and the AND gate 36 are deasserted. The output stage 37 outputs the clock signal $\phi_{i\_SEED}$ as the clock signal $\phi_i$ without modification. This operation is continued until the touch sensing is completed in the touch sensing period.

When touch sensing is completed in the touch sensing period, a touch sensing completion pulse is supplied from the touch controller 21 to the counter 33. The counter 33 resets the count value upon reception of the touch sensing completion pulse, and starts the counting operation in synchronization with the internal clock signal CLK_INT.

The comparator 34 compares the count value of the counter 33 with the register value, and asserts the output signal thereof when the count value reaches the register value. When the output signal of the comparator 34 is asserted, the output signal of the AND gate 36 is asserted and the clock signal $\phi_i$ outputted from the output stage 37 is further asserted.

In the meantime, the output signal of the inverter 35 is deasserted and the counter 33 stops the counting operation. Subsequently, the clock signal $\phi_i$ is kept asserted.

In the operation described above, the clock signal $\phi_{i\_SEED}$ is outputted as the clock signal $\phi_i$ without modification, when the clock signal $\phi_{i\_SEED}$ is asserted before the counter value of the counter 33 reaches the register value after the completion of the touch sensing in the touch sensing period. When the counter value of the counter 33 reaches the register value before the clock signal $\phi_{i\_SEED}$ is asserted, on the other hand, the clock signal $\phi_i$ is forcedly asserted. This operation restricts the maximum time duration from the completion of the touch sensing to the assertion of the clock signal $\phi_i$. When the clock signal $\phi_i$ is asserted, the corresponding gate drive signal is driven to the high level, and this prevents the time duration during which all the gate lines 7 are set to the low level from being excessively long. Such operation effectively suppresses a charge leakage, which may affect the image quality.

Figure 7:
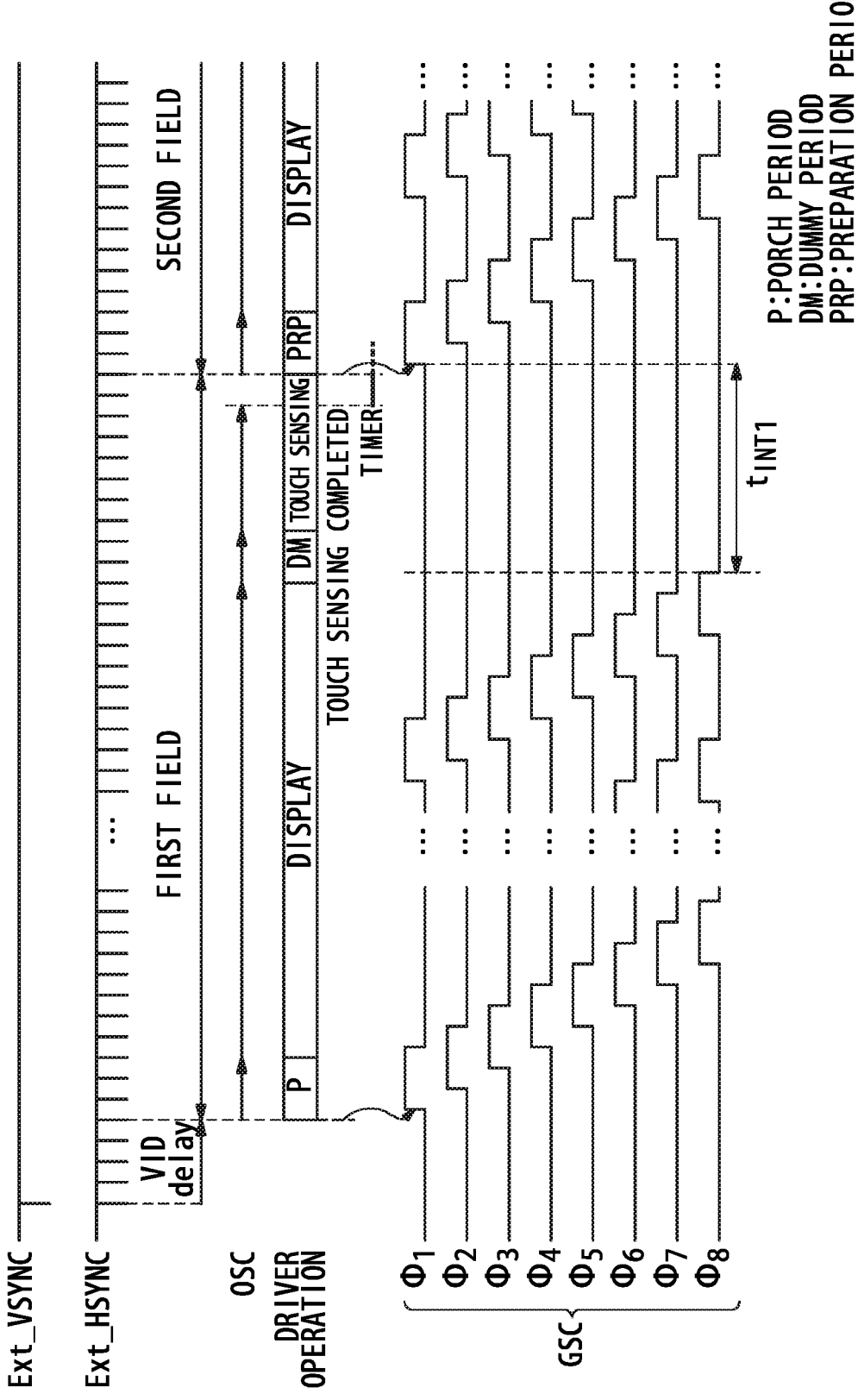
FIG. 7 is a timing chart illustrating the operation of the display device in one or more embodiments.
Figure 8:
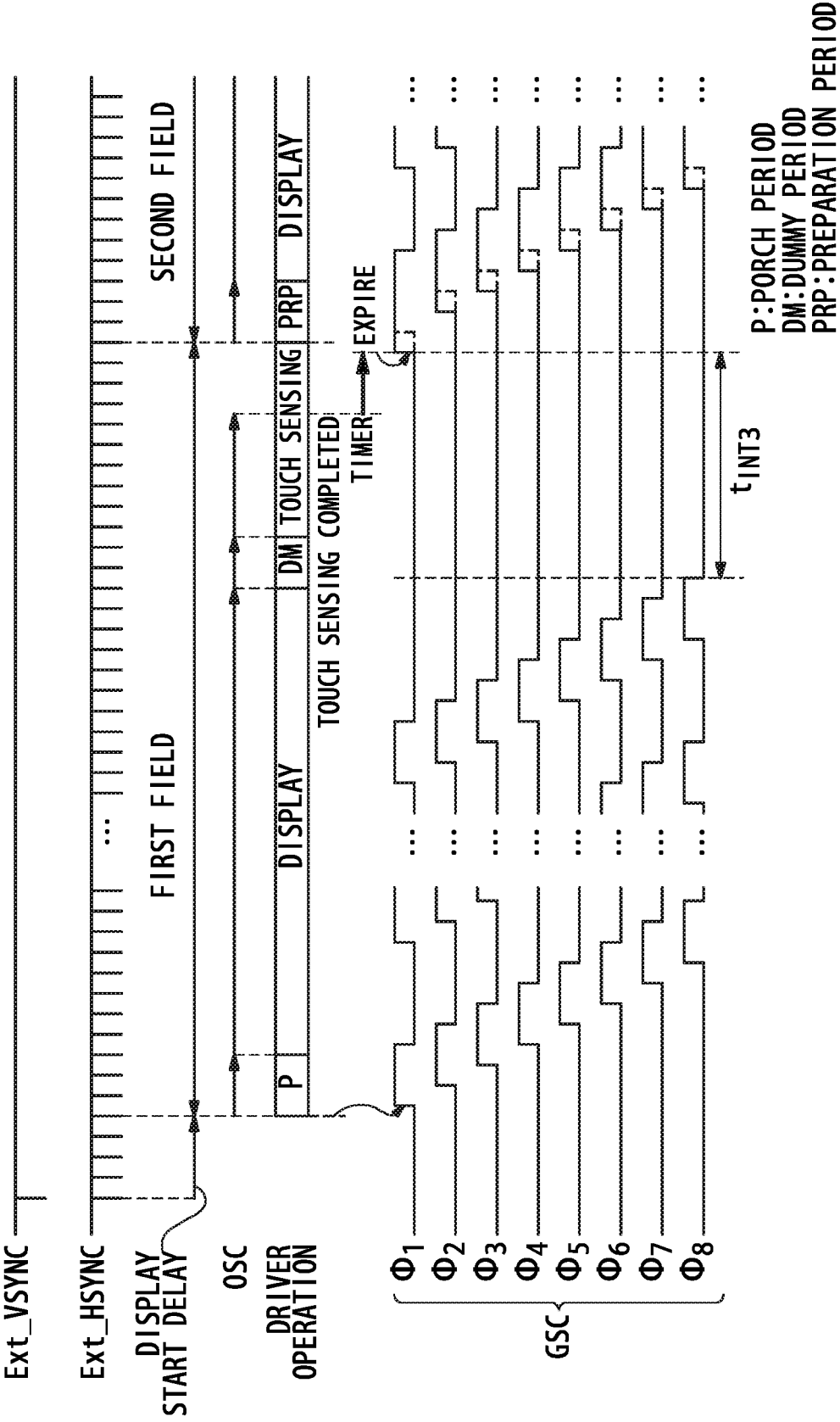
FIG. 8 is a timing chart illustrating the operation of the display device in one or more embodiments.

FIGS. 7 and 8 are timing charts illustrating the operation of the display device 10 in the case when the panel interface 25 includes the gated shift clock generator circuitry 30 configured as illustrated in FIG. 6. FIG. 7 illustrates the case when the display device 10 performs a normal operation, and FIG. 8 illustrates the case when the frequency of the horizontal sync signal Ext_HSYNC is reduced.

When the first field is started, a preparation for driving pixel circuits 8 in the following display period is performed in the porch period, and drive voltages are sequentially written into selected lines of the pixel circuits 8. After the dummy period is then completed, the touch sensing period is started.

When the touch sensing is completed, the counting operation of the counter 33 is started in the timer circuitry 32. When the display device 10 normally operates, as illustrated in FIG. 7, the second field is started before the count value of the counter 33 reaches the register value after the completion of the touch sensing. After the start of the second field, the clock signals $\phi_1$ to $\phi_8$, which are used as the gated shift clocks, are sequentially asserted.

When the frequency of the horizontal sync signal Ext_HSYNC is reduced as illustrated in FIG. 8, the start timing of the second field is delayed. In this case, however, the count value of the counter 33 reaches the register value in the gated shift clock generator circuitry 30 which generates the clock signal $\phi_1$ before the second field is started, and the clock signal $\phi_1$, which is one of the gated shift clocks, is asserted. Since the clock signal $\phi_1$ is used to generate the waveform of the gate drive signal supplied to the gate line 7 to be first driven in the second field, this gate line 7 is driven to the high level in response to the count value of the counter 33 reaching the register value. The clock signals $\phi_2$ to $\phi_8$ are then sequentially asserted. In this operation, the period $t_{INT3}$ from the deassertion of the clock signal $\phi_8$ to the assertion of the clock signal $\phi_1$ is reduced.

The undesired "charge leakage" is effectively suppressed in both of the above-described operations.

Additionally, the above-described operations effectively enlarge the allowed range of the timing at which the touch sensing is completed. Since the touch sensing takes time, the timing at which the touch sensing is completed is set so as to be able to provide sufficient time for achieving touch sensing when the frequency of the horizontal sync signal Ext_HSYNC is increased and/or the frequency of the internal clock signal CLK_INT is decreased, whereas the timing at which the touch sensing is completed is set so as not to be excessively delayed in view of the image quality.

Figure 9A:
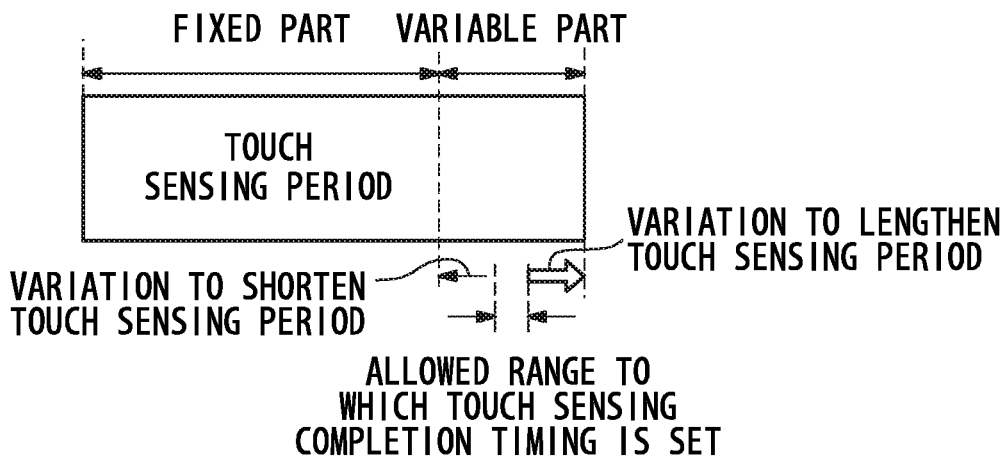
FIGS. 9A and 9B illustrate settings of the timing at which touch sensing is completed in one or more embodiments.

As illustrated in FIG. 9A, when the timer circuitry 32 is disabled, the completion timing of the touch sensing is required to be early to some degree, to maintain the image quality.

Figure 9B:
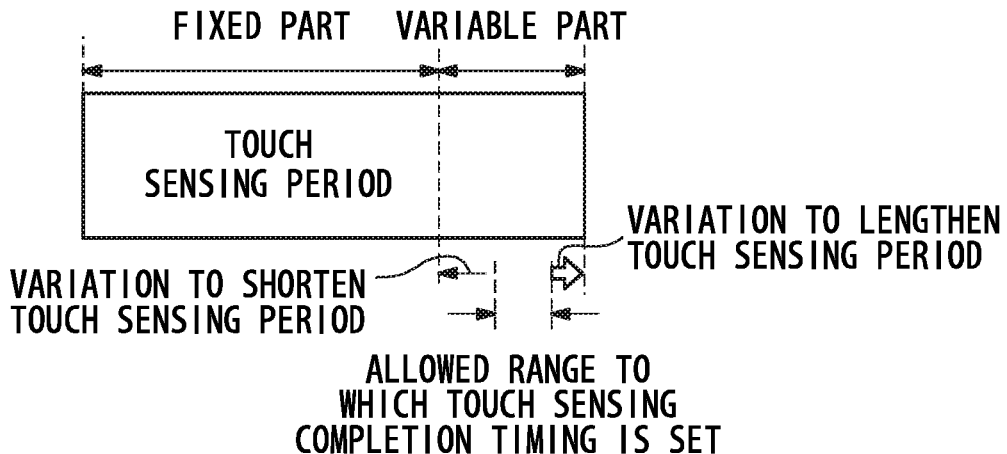

In contrast, when the timer circuitry 32 is enabled, as illustrated in FIG. 9B, the completion timing of the touch sensing is allowed to be delayed, since the timer circuitry 32 reduces the time duration until the next gate line 7 is driven to the high level after the completion of the touch sensing, to or below a given time duration.

In one or more embodiments, the start timings of the second field and the following fields may be controlled so as not to be excessively early, on the basis of the count value of the counter 27a, which is used to control the start timings of the display period, the dummy period and the touch sensing period.

More specifically, in one or more embodiments, the timing generator 27 refers to the count value of the counter 27a when receiving a predetermined number of instructions, such as HSYNC packets, to start the horizontal sync periods corresponding to the length of each field. the timing generator 27 controls the circuitry integrated in the display driver 2 to start the next field, when the count value of the counter 27a is equal to or more than a given value. When the count value of the counter 27a is less than the given value, the next field is not started. In this case, the timing generator 27 refers to the count value of the counter 27a again, when receiving an instruction to start the next horizontal sync period from the host 3. Subsequently, a similar operation is repeated until the count value becomes equal to or more than the given value when the timing generator 27 receives an instruction to start the next horizontal sync period.

When the frequency of the horizontal sync signal Ext_HSYNC, which is generated in the host 3, is increased, the start timing of each field is advanced, and this may lead to that the touch sensing period expires before the touch sensing is completed. When the frequency of the internal clock signal CLK_INT is reduced, the start timing of the touch sensing period is delayed, and this may also lead to that the touch sensing period expires before the touch sensing is completed. The above-described operation, however, provides a touch sensing period of an appropriate length.

In the above-described embodiments, the timings at which the clock signals $\phi_1$ to $\phi_8$ are asserted after the completion of the touch sensing are relatively advanced, when the horizontal sync signal Ext_HSYNC is reduced. By making use of this operation, the timing of the display operation performed just after the completion of the touch sensing may be made earlier.

A person skilled in the art would appreciate that the present invention is not limited to the above-described embodiments, and may be implemented with various modifications without departing from the scope of the invention.

What is claimed is:

1. A display driver, comprising:
   a controller configured to perform touch sensing during a first touch sensing period of a first field of a vertical sync period and to perform touch sensing during a second touch sensing period of a second field of the vertical sync period; and
   gate control signal generator circuitry configured to:
      generate a first set of multi-phase clock signals configured to control first gate line drive signals supplied to gate lines of a display panel during a first display period of the first field of the vertical sync period; and
      generate a second set of multi-phase clock signals configured to control second gate line drive signals supplied to the gate lines of the display panel during a second display period of the second field of the vertical sync period, wherein a start time of a first multi-phase clock signal of the second set of multi-phase clock signals is based on an internal clock signal of the display driver and is before a start time of the second field of the vertical sync period.

2. The display driver of claim 1, wherein the first field starts after an assertion of a vertical sync signal, wherein a length of a delay between the assertion of the vertical sync signal and the start of the first field corresponds to one or more assertions of a horizontal sync signal.

3. The display driver of claim 2, wherein a length of the first touch sensing period corresponds to a frequency of the internal clock signal of the display driver and a frequency of the horizontal sync signal.

4. The display driver of claim 1, further comprising:
timer circuitry including a counter configured to count a second clock signal, wherein the first multi-phase clock signal of the second set of multi-phase clock signals is generated in response to a count value of the counter reaching a first value.

5. The display driver of claim 4, wherein the counter is configured to count the second clock signal in response to completion of the first touch sensing period.

6. The display driver of claim 1, wherein each of the first gate line drive signals is driven high in response to an assertion of a respective one of the first multi-phase clock signals.

7. A display device, comprising:
a display panel comprising gate lines; and
a display driver coupled to the display panel and configured to:
perform touch sensing during a first touch sensing period of a first field of a vertical sync period and perform touch sensing during a second touch sensing period of a second field of the vertical sync period;
generate a first set of multi-phase clock signals configured to control first gate line drive signals supplied to the gate lines of the display panel during a first display period of the first field; and
generate a second set of multi-phase clock signals configured to control second gate line drive signals supplied to the gate lines of the display panel during a second display period of the second field of the vertical sync period, wherein a start time of a first multi-phase clock signal of the second set of multi-phase clock signals is based on an internal clock signal of the display driver and is before a start time of the second field of the vertical sync period.

8. The display device of claim 7, wherein the first field starts after an assertion of a vertical sync signal, wherein a length of a delay between the assertion of the vertical sync signal and the start of the first field corresponds to one or more assertions of a horizontal sync signal.

9. The display device of claim 8, wherein a length of the first touch sensing period corresponds to a frequency of the internal clock signal of the display driver and a frequency of the horizontal sync signal.

10. The display device of claim 8, wherein the display driver is further configured to count a second clock signal, and wherein the first multi-phase clock signal of the second set of multi-phase clock signals is generated in response to the count reaching a first value.

11. The display device of claim 10, wherein the display driver is configured to count the second clock signal in response to completion of the first touch sensing period.

12. The display device of claim 7, wherein each of the first gate line drive signals is driven high in response to an assertion of a respective one of the first multi-phase clock signals.

13. A method for driving a display device having a display driver, the method comprising:
performing touch sensing during a first touch sensing period of a first field of a vertical sync period;
generating first multi-phase clock signals configured to control first gate line drive signals supplied to gate lines of a display panel during a first display period of the first field, wherein the first field starts after a delay from an assertion of the vertical sync period, and wherein a start timing of the first display period and a start timing of the first touch sensing period are synchronous with an internal clock signal of the display driver;
performing touch sensing during a second touch sensing period of a second field of the vertical sync period; and
generating a second set of multi-phase clock signals configured to control second gate line drive signals supplied to the gate lines of the display panel during a second display period of the second field of the vertical sync period, wherein a start time of a first multi-phase clock signal of the second set of multi-phase clock signals is based on the internal clock signal of the display driver and is before a start time of the second field of the vertical sync period.

14. The method of claim 13, wherein the first field starts after an assertion of a vertical sync signal, wherein a length of a delay between the assertion of the vertical sync signal and the start of the first field corresponds to one or more assertions of a horizontal sync signal.

15. The method of claim 14, wherein a length of the first touch sensing period corresponds to a frequency of the internal clock signal of the display driver and a frequency of the horizontal sync signal.

16. The method of claim 13, further comprising:
counting a second clock signal, wherein the first multi-phase clock signal of the second set of multi-phase clock signals is generated in response to a count value reaching a first value.

17. The method of claim 16, further comprising:
counting the second clock signal in response to completion of the first touch sensing period.

18. The display driver according to claim 1, wherein the gate control signal generator circuitry is configured to prevent a time period between an end time of the first set of multi-phase clock signals and a start time of the second set of multi-phase clock signals from exceeding a predetermined amount of time.

19. The display device according to claim 7, wherein the display driver is configured to prevent a time period between an end time of the first set of multi-phase clock signals and a start time of the second set of multi-phase clock signals from exceeding a predetermined amount of time.

20. The method according to claim 13, wherein the display driver prevents a time period between an end time of the first set of multi-phase clock signals and a start time of the second set of multi-phase clock signals from exceeding a predetermined amount of time.

* * * * *